United States Patent [19]

Harkins

[11] Patent Number: 4,684,510
[45] Date of Patent: Aug. 4, 1987

[54] METHOD AND APPARATUS FOR PREVENTION OF ATMOSPHERIC CORROSION OF ELECTRONIC EQUIPMENT

[75] Inventor: Carl G. Harkins, Sunnyvale, Calif.

[73] Assignee: Hewlett-Packard Company, Palo Alto, Calif.

[21] Appl. No.: 811,969

[22] Filed: Dec. 20, 1985

[51] Int. Cl.⁴ .................. B01J 8/04; B01D 50/00
[52] U.S. Cl. ..................... 423/210; 423/230; 423/239; 423/240; 423/244; 422/193; 360/97; 55/97; 55/316; 55/385 E; 55/485; 55/DIG. 42
[58] Field of Search ............. 55/71, 73, 316, 387, 55/97, 316, 385 E, 485, 486, 487, 525, DIG. 33, DIG. 35, DIG. 42; 204/150, 249; 422/122, 193; 360/97-99; 423/210, 230, 239, 240 R, 244 R

[56] References Cited

U.S. PATENT DOCUMENTS

| 1,040,914 | 10/1912 | Farmer | 55/485 |
| 1,315,163 | 9/1919 | Schwartz | 55/316 |
| 1,422,211 | 7/1922 | Lamb | 422/193 |
| 3,555,787 | 1/1971 | Lustig | 55/316 |
| 3,740,735 | 6/1973 | Gabor | 55/385 E |
| 3,817,716 | 6/1974 | Betz | 422/171 |
| 4,152,229 | 5/1979 | Soltys et al. | 204/150 |
| 4,386,948 | 6/1983 | Choksi et al. | 128/205.12 |

FOREIGN PATENT DOCUMENTS 28745 2/1980 Japan ........................ 422/122

OTHER PUBLICATIONS

H. A. Bray, Porous Metal Foams, Filtration & Separation May/Jun. 1973, pp. 321, 322, 323 and 325.

Primary Examiner—David L. Lacey
Attorney, Agent, or Firm—William J. Bethurum

[57] ABSTRACT

A chemical filter is provided for preventing pollutants in the atmosphere from contaminating sensitive electronic equipment, such as hard disc drives. The chemical filter comprises a layer of charcoal or charcoal-impregnated foam to remove organic contaminants and at least one layer of a high surface area metal to remove inorganic pollutants, such as $SO_2$, $H_2S$, $NO_2$ and $Cl_2$. In one embodiment, the chemical filter comprises a layer of charcoal, a layer of a copper foam, a layer of a nickel foam and a layer of a particle filter.

A method is also provided for preventing pollutant molecules in the atmosphere from contaminating electronic equipment. The method comprises interposing the chemical filter of the invention between the electronic equipment and the source of the pollution, introducing polluted air into the chemical filter, reacting pollutant molecules with the high surface area metal, and introducing filtered air to the electronic equipment.

23 Claims, 3 Drawing Figures

U.S. Patent    Aug. 4, 1987    4,684,510
Fig. 1.
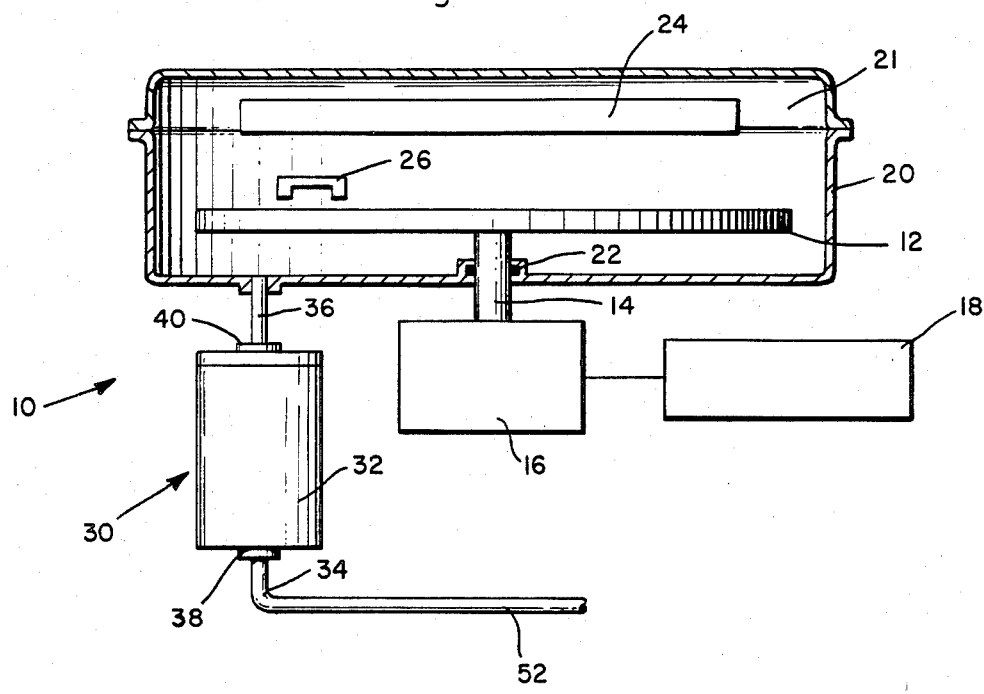
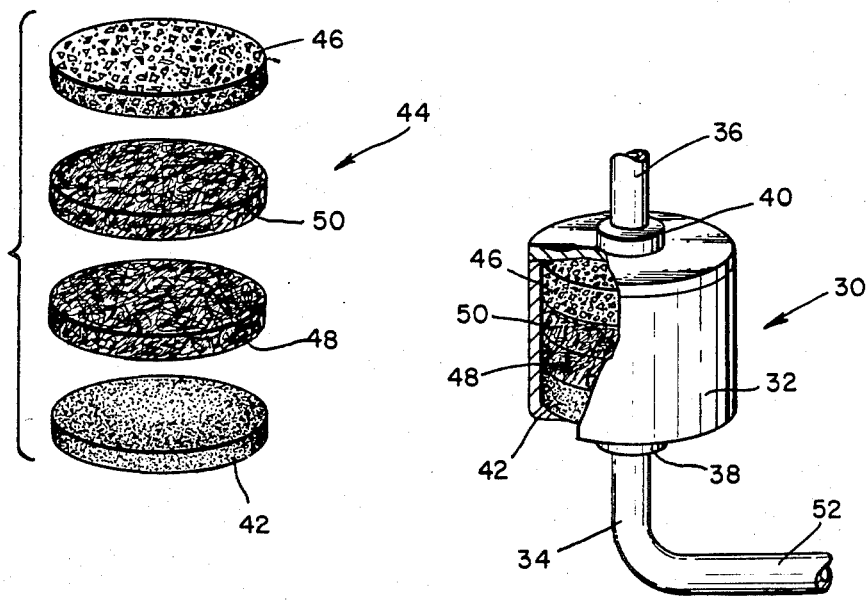
Fig. 2.
Fig. 3.

METHOD AND APPARATUS FOR PREVENTION OF ATMOSPHERIC CORROSION OF ELECTRONIC EQUIPMENT

BACKGROUND OF THE INVENTION

This invention relates to chemical filters, and, more particularly, to a chemical filter for protecting electronic equipment, such as hard discs for computers, from pollutants in the air.

Atmospheric corrosion of ferromagnetic materials by pollutant molecules such as $SO_2$, $H_2S$, $NO_2$ and $Cl_2$ is a serious problem in many plant environments in which computer equipment is used, such as for process control. Examples of such plant environments include paper mills and oil refineries. While the level of pollutants at such plants may be within OSHA standards, nevertheless, even pollution levels in the range of parts per billion, far below what is permissible for humans, is detrimental to components in computer equipment, such as metals employed in electrical connections on printed circuit boards and in disc drives. Importantly, ferromagnetic materials, such as cobalt, used in disc drives are adversely affected by pollutants.

In hard disc drives employing cobalt, for example, the chemical reaction of the pollutants with the metal serves to form corrosion products such as oxides and chlorides, which have a larger crystallographic cell structure than the metal itself. This occurs as a result of water vapor from the atmosphere, which forms a thin film, about 100 to 200 Ångstroms thick. The pollutants dissolve in the water film, forming an acid electrolyte, which corrodes the metal. As a consequence of the formation of the corrosion products, the disc drive head, which is positioned to travel at a high rate of speed very close to the metal surface, hits the expanded corrosion products, called "crashing", with consequent damage to the head and possible loss of data.

A further problem includes organic contaminants in the atmosphere, which are readily polymerized by cobalt and cobalt oxide, well-known for their catalytic properties. The presence of organic polymers causes a problem termed "stiction", in which the head of the disc drive adheres to the organic film and is subsequently torn off during operation of the disc drive.

Attempts have been made to minimize the corrosion problem by forming a protective film over the metal surface. However, the protective film has been found to reduce the signal from the magnetic domains in the metal film.

The solution described above has been applied to disc drives which are primarily sealed but nonetheless communicate with the outside atmosphere. In such units, the flow of air to the hard disc unit is on the order of 15 to 100 ft$^3$ over the lifetime of the unit. The flow of air is considered necessary for maintaining the internal pressure the same as the ambient barometric pressure. In many environments, this is sufficient to cause corrosion failure.

Summary of the Invention

Accordingly, it is an object of this invention to provide a filter for preventing atmospheric pollutants from contaminating metal surfaces in electronic equipment.

It is a further object of this invention to provide a chemical filter which readily permits passage of air therethrough and thus permits equalization of atmospheric pressure in a hard disc drive unit, while removing pollutants from the air.

These and further objects of the invention will become apparent from the hereinafter following commentary taken in conjunction with the drawing.

In accordance with the invention, a chemical filter is provided which includes at least one layer of a high surface area metal mesh. Additionally, the chemical filter may include a layer of charcoal and a particle filter. The chemical filter is maintained in a housing, which is provided with an inlet for admitting air and an outlet for exhausting air into an otherwise sealed electronic unit.

BRIEF DESCRIPTION OF THE DRAWING

FIG. 1 is a schematic of a hard disc drive, including the chemical filter of the invention;

FIG. 2 is an exploded view of a preferred embodiment of the chemical filter of the invention; and FIG. 3 is a three-dimensional view of the chemical filter of the invention, partially broken away, showing the relationship of the various layers depicted in FIG. 2.

DETAILED DESCRIPTION OF THE INVENTION

Referring to the drawing wherein like numerals of reference designate like elements throughout, a piece of electronic equipment which is to be protected from pollutants in the atmosphere is depicted in FIG. 1. In particular, a hard disc drive 10 is shown, comprising a disc 12 mounted on a shaft 14 which is rotated by a motor 16. The motor 16 is controlled by electronic controller 18.

A housing 20 surrounds the hard disc 12, forming a chamber 21; a seal 22 is provided for the shaft 14 to pass through the housing 20. An internal particle filter 24 in the chamber 21 reduces particles generated by abrasion and the like during operation of the disc drive. A head 26, spaced from the top surface of the disc 12, is used to write and read information stored in magnetic domains formed in the surface of the hard disc 12.

The hard disc may comprise any material commonly used in the construction of such units; for example, an aluminum substrate coated with cobalt may be employed. Inasmuch as the disc drive unit is not a part of this invention, the foregoing description is provided merely for illustration of one use to which the chemical filter of the invention may be put.

In accordance with the invention, a chemical filter 30 is provided. The chemical filter comprises a housing 32 provided with an inlet means 34 at one end and an outlet means 36 at another end. The inlet means 34 is coupled to the housing 32 by coupling means 38, while the outlet means is coupled to the housing 32 by coupling means 40. The coupling means may comprise any such means well-known, such as nuts and the like.

The material of the filter housing 32 may comprise any convenient material, such as a plastic. Alternatively, the housing 32 may comprise a metal, which could be employed as one corrosion cell electrode when using a high surface area metal mesh as the second electrode. The formation of corrosion cells is discussed more fully below.

The invention resides in means for removing multiple pollutants from the air entering the inlet means 34. The following means for removing pollutants from the air may be employed: a layer of charcoal 42 to remove organic contaminants and at least one layer 44 of a high surface area metal mesh to remove inorganic pollutants. While not essential to the operation of the invention, a particle filter 46 is suitably employed to prevent particles of charcoal, metal or corrosion product (reaction of pollutant with the metal mesh) from entering the interior 21 of the disc drive unit 10. The particle filter 46 may comprise any material conveniently useful for such purpose. Exemplary suitable particle filter materials include paper, glass fibers or porous plastic materials suitable for retaining particles larger than about 1 micrometer.

The charcoal employed in layer 42 may comprise any high surface area charcoal commercially available, but preferably is a charcoal incorporated in a polyester or polyurethane foam. Such charcoal foam is commercially available from Lewcott Chemicals & Plastics, Milbury, Mass. As indicated above, the charcoal is used primarily to adsorb organic contaminants, although the charcoal is helpful in partially removing inorganic pollutants as well.

At least one metal layer 44 is employed to remove inorganic pollutants, such as $SO_2$, $H_2S$, $NO_2$ and $Cl_2$. Preferably, a combination of two metals is employed, one to remove sulfur-containing and nitrogen-containing pollutants and one to remove chlorine-containing pollutants. A metal suitable for the former case is copper or silver, while a metal suitable for the latter case is nickel or zinc. Most preferably, two layers, 48 and 50, are employed, layer 48 comprising a high surface area copper mesh and layer 50 comprising a high surface area nickel mesh.

The metal mesh is a high surface area material, typically on the order of 2 to 3 $m^2/g$, with a fine pore size on the order of a few mils. A convenient material to use is metal foam, which is commercially available as FOAMETAL, a trademark of Hagen Industries, Willoughby, Ohio. Alternatively, metal felts are also available which may be advantageously employed in the practice of the invention; metal felts such as Met-L-Mat, a product of National-Standard, Corbin, Ky., may be used.

It will be appreciated that the use of the term "metal" in the context of the present invention encompasses not only pure metals, such as copper and nickel, but also alloys, which also perform the same function as described above. Examples of suitable alloys include brasses and copper-silver.

For use in a 5¼ inch hard disc drive, the chemical filter of the invention conveniently comprises disks of material (charcoal, metal foams and particle filter) about 1 inch in diameter and ⅛ inch thick. For this low flow application, the inlet and outlet means 34 and 36, respectively, are tubes having an ID of about ⅛ inch or less.

The foam is about 45% dense and thus does not greatly reduce the volume of air flow therethrough. Consequently, the chemical filter of the invention may also be employed in high flow applications as in conjunction with cooling fans, which are provided for cooling electronic equipment. In such a configuration, one or more of the metal foams may be placed in a holder between the cooling fan and printed circuit boards of electronic devices. Even though the circuit boards are exposed to the atmosphere, the removal of pollutants from the flow of air from the fan, is sufficient to retard the corrosion of the metal connections on the circuit board.

The chemical filter of the invention may employ just one metal foam or felt. However, better results are obtained using one metal in combination with the charcoal, and even better results are obtained using two metals in combination with the charcoal. For disc drive applications, it is preferred to employ the particle filter at the exit from the chemical filter.

Most preferably, the two metals or a metal and carbon (acting as a noble metal) are chosen and configured so as to form a galvanic corrosion cell within the chemical filter. In particular, a noble metal and an active metal are placed in electrical contact. The placement of the two metals, for example, copper and nickel, in electrical contact potentiate the corrosion cell. Water vapor from the air forms a water film electrolyte on the metals and thus establishes the cell. The corrosion cell configuration provides a faster rate of reaction with the contaminants; the potential difference between the two metals is an additional driving mechanism to form corrosion products.

As an example, hard discs following manufacture were mapped and found to evidence about 20 detectable defects over the surface of the disc. Exposure to 15 $ft^3$ of polluted air of the type described above resulted in about 3,000 defects, while use in the same polluted environment of the chemical filter of the invention, comprising four layers (charcoal, copper, nickel and the particle filter, configured as a corrosion cell), showed no change from the as-manufactured disc.

It may be desired to also reduce the amount of water vapor in the air from reaching the chamber housing the disc drive. While the cobalt film of the hard disc is provided with a cobalt oxide film for protection, neverthess, there is always the possibility of pinholes in the oxide film, through which water vapor can penetrate and react with the underlying cobalt to form cobalt oxide and recording defects. The uncontrolled growth of the new cobalt oxide results in an expansion of the surface layer, again creating the possibility of crashing of the head against the surface, as described earlier.

The trapping of water vapor may be accomplished by providing a dessicant, either associated with the chemical filter or as a separate unit which communicates directly with the disc drive chamber. If used in conjunction with the chemical filter of the invention, it is preferred that the dessicant be located between the chemical filter and the disc drive housing. In this manner, water vapor will be available to establish the preferred corrosion cell in the chemical filter, as described above.

Alternatively, an anti-diffusion tube 52 may be provided. The anti-diffusion tube is fabricated from plastic tubing having an ID and length chosen in accordance with Fick's law of diffusion. The anti-diffusion tube should be less than about ⅛ inch ID, in order to prevent convection within the tube. For example, a tubing having an ID of 1 mm and a length of 10 cm, attached to the inlet means 34 of the chemical filter of the invention, will reduce the maximum water vapor diffusion flux at 30° C. to about 1 g/yr.

The anti-diffusion tube should be fabricated from a hydrophobic material, such as a plastic. Examples include polyethylene, polypropylene and polytetrafluoroethylene. However, such materials should not include plasticizers, which are sufficiently volatile to act as an additional contaminant. Materials such as stainless steel, which form hydrophilic oxides, should be avoided in constructing the anti-diffusion tube in order to prevent wicking of the water vapor, which defeats the purpose of the tube.

For high flow rate applications, such as in conjunction with cooling fans, a change in color of one of the metals is sufficient to indicate a need to change the filter. For example, copper will turn black, while nickel will turn green. In such applications, the material comprising the housing 32 would conveniently be clear.

For low flow rate applications, such as in conjunction with disc drives, the chemical filter of the invention is not intended to be removed, but rather is sized to last approximately 10 years in most polluted environments. Dimensions such as given above are adequate for this purpose.

EXAMPLES

Printed circuit boards patterned with a bridge circuit for measuring resistance changes induced by corrosion reactions were employed in the test. Metal disks comprising nickel and Permalloy (Fe-Ni alloy) were mounted such that one portion was directly exposed to the atmosphere, a second portion was exposed to the atmosphere through a first vented plastic (acrylic) chamber containing a 3 micrometer Millipore particle filter, and a third portion was exposed to the atmosphere through a second vented plastic chamber containing the chemical filter of the invention. The particle filter in the second chamber was identical to that used in the first chamber. A similar arrangement was used for comparison of copper (or gold) conductors on the PC boards.

The chemical filter comprised a layer of charcoal foam, a layer of copper foam, a layer of nickel foam, and the particle filter. The charcoal foam was ⅛ inch thick. The metal foams had a surface area of 2–3 m²/g and were ⅛ inch thick.

In addition to the foregoing samples, metal coupons (silver, copper and zinc) were directly exposed to the atmosphere. The metal coupons provided a qualitative measure of the extent of sulfur- and chlorine-containing pollutants in the environment. While any of the foregoing metals will provide a suitable measure of the sulfur- and chlorine-containing pollutants, nickel is better for chlorine, while copper is better for sulfur.

The chamber port openings were 0.55 cm in diameter and 0.32 cm in length. It was expected that for this configuration, typical pollutants in the range of 10 to 100 ppb should show fluxes of about 1 to 10 millimoles per year.

All metal samples were cleaned in Freon prior to mounting on the PC board. Mounting was accomplished using hot-melt polyethylene adhesive. This adhesive was also used to bond the plastic chambers to the PC boards.

The boards were then exposed to the environment at several industrial plant sites, including paper mills and oil refineries. Exposure was on the order of several months.

Testing for various species associated with common pollutants was done using X-ray fluorescence analysis (XRF) and ion chromatography (IC).

Example 1

At plant Site A, the environment was high in sulfur (both $H_2S$ and $SO_2$) and $Cl_x$ ($Cl_2$ and probably $ClO_2$). A trace of $NO_3$ was detected by IC. Both the disk and Permalloy selectively reacted to form chlorides. The 3 micrometer Millipore filter impeded sulfur diffusion, but was not as effective in reducing $Cl_x$ attack.

With regard to the chemical filter (full filter: charcoal, Cu, Ni, particle filter), the copper foam trapped chlorine, but was observed to be more efficient for sulfur compounds. $Cl_x$ species penetrating the copper foam were trapped by the nickel foam. This order of materials is preferred since the nickel surface is protected from the sulfur and remains available for chlorine scavanging. In long exposures, additional chlorine reacts with copper sulfide at the front copper surface. The displaced sulfur then migrates into the unreacted copper foam.

The IC analyses confirm and extend the XRF results at Site A. Soluble chlorides dominate insoluble sulfides. The 1-year full-filtered values were below the limit of detection even for this measurement technique.

Example 2

Site B was the second most aggressive site. The environment at this location tended to be high in sulfur compounds and low in $Cl_x$. This was reflected in the data from the Ag and Zn metal foils. Again, the disk and Permalloy samples in open air reacted with both, but preferably with $Cl_x$. The particle filter again impeded sulfur transport to the samples. The metal foam filter was less challenged by the Site B environment than by the Site A environment, since the copper layer traps the sulfur and the small amount of chlorine without the reaction interface reaching the back side of the copper in 12 months. The nickel foam evidenced little reaction and was not required as a backup chlorine trap. Thus, at a plant site having the characteristics as Site B, the chemical filter of the invention could include only the copper foam as the high surface area metal mesh.

Example 3

The environment at Site C contained $Cl_x$ (primarily HCl) as the major contaminant, sulfur not being detected on the exposed Ag and Cu coupons. As expected, both the disk and Permalloy samples reacted with $Cl_x$, even beneath the particle filter. A variation on the chemical filter was also tested at this site, comprising one or two charcoal layers over the particle filter (omitting the metal mesh layers). The results showed that the addition of one or two charcoal layers over the particle filter reduced the chloride attack of the samples. The charcoal impedes $Cl_x$, but it cannot be counted upon as a total barrier. In comparison, the full chemical filter trapped $Cl_x$ that had diffused through the charcoal layer.

Example 4

The environment at Site D was the most severe site for computers and was located in the same plant as Site A (Example 1). For the Site D computer, room air conditioning plus an environmental cabinet reduced the copper activity over an order of magnitude. A similar reactivity reduction for the film samples and filter showed up in two ways: (1) the IC data for unprotected disks and XRF data indicated that $Cl_x$ reactions were down an order of magnitude, and (2) the volume of copper foam consumed in the filter (mostly sulfides) was also down by an order of magnitude. The XRF results indicated that there was no corrosion on protected thin film samples, although the IC indicated a possible chloride presence on Permalloy. If this represents environmental penetration through copper foam, an additional layer of nickel foam would have trapped the $Cl_x$ as at Site A.

Example 5

The environment at Site E was the second most severe computer site for copper. The high S/Cl ratio was reflected in an analysis of one of the PC boards, which showed chloride formation on an unprotected disk while the first copper filter layer showed sulfide formation without Cl. The $Cl_x$ level at Site E was low enough for chloride formation to be undetectable under a particle filter, and sulfur removal by the chemical filter is readily accomplished at this type of site.

Almost all other sites (other than one) tested were much less reactive than those described above. These other sites evidenced neither corrosion of the samples under the chemical filter of the invention nor failure of the chemical filter. At the one site mentioned, the data were diverse and internally inconsistent, and thus, the data were discarded from further consideration.

Example 6

In order to explore the correlation between field exposure and accelerated tests, field sample PC boards were exposed in a controlled environmental chamber for one week. In this case, the S/Cl ratios and the amount of co-reactants (150 ppb $SO_2$, 150 ppb $H_2S$, 40 ppb $Cl_2$ and 300 ppb $NO_2$) were exactly known. As in the field, the transition metals reacted preferentially with the chlorine, while the copper (foil and foam) formed sulfides. Disk and Permalloy samples reacted slightly with $SO_2$ to form trace sulfates. There was minimal nitrate formations from $NO_2$, confirming that the nitrate/nitrite source for filtered samples was probably not gas phase $NO_2$, but rather was due to nitrocellulose in the paper particle filter.

The acceleration factor for this laboratory test was 50X for an average industrial environment, so the results obtained were equivalent to one year in such an environment.

Thus, there has been disclosed a chemical filter especially adapted for use in protecting electronic equipment, such as hard disc drives and printed circuit board connections, which prevents pollutants in the air from chemically attacking the equipment. Various modification and changes will make themselves available to those of ordinary skill in the art, and all such changes and variances not deviating from the spirit and essence of the invention are intended to be covered by the appended claims.

What is claimed is:

1. A chemical filter for preventing pollutant molecules in the air from contaminating electronic equipment comprising:
   (a) a housing having at a first end an inlet means for introducing polluted air into said housing and at a second end a gas outlet means for introducing purified air into said equipment;
   (b) a layer of charcoal adjacent said inlet means;
   (c) at least one layer of a high surface area metal mesh adjacent said layer of charcoal;
   (d) a particle layer between said at least one layer of metal mesh and said outlet means; and
   (e) an anti-diffusion tube attached to said gas inlet means, said anti-diffusion tube having a length and diameter to reduce water vapor diffusion into a disk drive electronic unit to no more than about 1 g/yr at 30° C.

2. The chemical filter of claim 1 wherein said at least one layer of metal mesh comprises at least two layers of high surface area metal mesh between said layer of charcoal and said particle filter.

3. The chemical filter of claim 2 wherein said at least two layers of metal mesh, comprises one layer of a first metal mesh adjacent said layer of charcoal and a second layer of a second metal mesh adjacent said particle filter.

4. The chemical filter of claim 3 in which said first metal mesh consists essentially of a metal selected from the group consisting of copper and silver.

5. The chemical filter of claim 4 in which said first metal mesh consists essentially of copper.

6. The chemical filter of claim 3 in which said second metal mesh consists essentially of a metal selected from the group consisting of nickel and zinc.

7. The chemical filter of claim 6 in which said second metal mesh consists essentially of nickel.

8. The chemical filter of claim 1 in which said anti-diffusion tube comprises a hydrophobic material and has a diameter less than about $\frac{1}{8}$ inch.

9. In combination, an enclosed hard disk drive unit and a chemical filter attached thereto to permit equalization of air pressure therein and to filter pollutant molecules from air introduced into said unit, said chemical filter comprising:
   (a) a chamber defined by a housing, said housing provided with an inlet means at a first end for admitting polluted air and an outlet means at a second end for introducing filtered air into said hard disk drive unit, said outlet means connected to an air pressurization inlet in said drive unit; and
   (b) in sequence, the following layers of materials, beginning at said first end;
      (1) charcoal,
      (2) high surface area copper mesh,
      (3) high surface area nickel mesh, and
      (4) particle filter.

10. The combination of claim 9 in which the metal meshes comprise metal foams or metal felts.

11. A method of preventing pollutant molecules in the atmosphere from reacting with electronic equipment comprising:
   (a) providing a chemical filter between said electronic equipment and said atmosphere, said chemical filter comprising
      (1) a housing having a gas inlet means at a first end for admitting polluted air thereinto and a gas outlet means at a second end for introducing filtered air to said electronic equipment, and
      (2) at least one layer of a high surface area metal mesh within said housing, said at least one layer of metal mesh capable of chemically reacting with said pollutant molecules to form corrosion products which remain in said filter;
   (b) introducing said polluted air into said filter;
   (c) reacting said pollutant molecules with said at least one layer of metal mesh; and
   (d) introducing said filtered air to said electronic equipment.

12. The method of claim 11 wherein said filter additionally comprises a layer of charcoal adjacent said gas inlet means.

13. The method of claim 11 wherein said filter additionally comprises a particle filter adjacent said gas outlet means.

14. The method of claim 11 wherein said at least one layer of metal mesh comprises at least two layers of a high surface area metal mesh within said housing.

15. The method of claim 14 in which said metal mesh is selected from the group consisting of metal foam and metal felt.

16. The method of claim 14 wherein said at least one layer of metal mesh comprises two layers of metal mesh, a first of said layers comprises a noble metal and a second of said layers comprises an active metal.

17. The method of claim 16 wherein said first layer comprises a first metal mesh consisting essentially of a metal selected from the group consisting of copper and silver.

18. The method of claim 17 in which said first metal mesh consists essentially of copper.

19. The method of claim 16 wherein said second layer comprises a second metal mesh consisting essentially of a metal selected from the group consisting of nickel and zinc.

20. The method of claim 19 in which said second metal mesh consists essentially of nickel.

21. The method of claim 11 wherein said filter additionally comprises an anti-diffusion tube attached to said gas inlet means, said antidiffusion tube having a length and diameter to reduce water vapor diffusion into said electronic equipment to no more than about 1 g/yr at 30° C.

22. The method of claim 21 in which said anti-diffusion tube comprises a hydrophobic material and has a diameter less than about $\frac{1}{8}$inch.

23. The process of claim 11 in which said pollutant molecules comprise members selected from the group consisting of $SO_2$, $H_2S$, $NO_2$, $Cl_2$ and $HCl$.

* * * * *